US012738131B2

(12) United States Patent
Williams

(10) Patent No.: US 12,738,131 B2
(45) Date of Patent: Sep. 15, 2026

(54) SPOTTER BIT

(71) Applicant: Eric Matthew Williams, West Alexandria, OH (US)

(72) Inventor: Eric Matthew Williams, West Alexandria, OH (US)

( * ) Notice: Subject to any disclaimer, the term of this patent is extended or adjusted under 35 U.S.C. 154(b) by 240 days.

(21) Appl. No.: 18/649,338

(22) Filed: Apr. 29, 2024

(65) Prior Publication Data

US 2025/0265910 A1 Aug. 21, 2025

Related U.S. Application Data

(63) Continuation-in-part of application No. 18/581,449, filed on Feb. 20, 2024.

(51) Int. Cl.

| | |
|---|---|
| ***G08B 5/00*** | (2006.01) |
| ***B23B 51/02*** | (2006.01) |
| ***F21V 23/04*** | (2006.01) |
| *F21Y 113/13* | (2016.01) |
| *F21Y 115/10* | (2016.01) |

(52) U.S. Cl.
CPC ................ *G08B 5/00* (2013.01); *B23B 51/02* (2013.01); *F21V 23/045* (2013.01); *F21Y 2113/13* (2016.08); *F21Y 2115/10* (2016.08)

(58) Field of Classification Search
CPC ......... G08B 5/00; B23B 51/02; F21V 23/045; F21Y 2113/13; F21Y 2115/10
USPC ....................................................... 340/815.4
See application file for complete search history.

(56) References Cited

U.S. PATENT DOCUMENTS

| | | | | |
|---|---|---|---|---|
| 4,692,611 | A * | 9/1987 | Hoogenboom | G01S 17/08 250/227.28 |
| 6,328,505 | B1 | 12/2001 | Gibble | |
| 7,200,516 | B1 | 4/2007 | Cowley | |
| 9,193,022 | B1 * | 11/2015 | Janicki | A61B 17/1615 |
| D966,358 | S | 10/2022 | Giffen | |
| 11,484,952 | B2 | 11/2022 | Reid | |
| 2010/0078414 | A1 | 4/2010 | Perry | |
| 2014/0196922 | A1 | 7/2014 | Friedman | |

FOREIGN PATENT DOCUMENTS

| | | |
|---|---|---|
| WO | WO 2010/036318 | 4/2010 |

* cited by examiner

*Primary Examiner* — Eric Blount
(74) *Attorney, Agent, or Firm* — R. William Graham

(57) ABSTRACT

A spotter bit and system for use in identifying a hole location in a construction substrate which includes an illuminating member equipped for illuminating a visible light color for a particular construction trade, the illuminating member which extends through the hole and is maintained in position to enable easy locating of the hole by virtue of the spotter bit. The spotter bit can also include a sound emitting device and blue tooth controlled by a micro processor to assist operating and in the locating of the spotter bit.

23 Claims, 6 Drawing Sheets

13
15
D
L
D'
12
10
14
12
16
T

SPOTTER BIT

This application is a continuation in part and claims the benefit of U.S. application Ser. No. 18/581,449 filed Feb. 20, 2024.

BACKGROUND OF INVENTION

Field of Invention

The invention relates generally to locating devices. More particularly, the invention relates to improvements on the inventor's device and system for easily identifying the location of predrilled holes in construction substrates, such as ceilings and floors in U.S. application Ser. No. 18/581,449 filed Feb. 20, 2024.

Prior Art

During the construction process, particularly in multi-story buildings or structures with complicated areas or designs, identifying the precise locations of holes drilled through ceilings or floors poses a significant challenge for builders, contractors, and maintenance personnel. These holes serve various purposes such as accommodating wiring, plumbing, ventilation ducts, and other utilities critical to the functioning of the building.

Typically, once the construction phase is complete, locating these drilled holes becomes cumbersome and time-consuming, often leading to inefficiencies, delays, and potential damage during maintenance or renovation activities. Examples of this include trying to locate hole(s) in the case where insulation has been installed in a ceiling and the contractor is trying to locate the hole while sifting through insulation or walking on rafters above the ceiling and trying to avoid damage to the ceiling.

The conventional methods employed for identifying drilled holes lack precision and efficiency. Builders often resort to manual techniques such as measuring distances from fixed reference points or relying on architectural drawings, which are prone to inaccuracies and inconsistencies. Additionally, as buildings age and undergo modifications, the original plans may become outdated or unavailable, further complicating the process of locating drilled holes.

Furthermore, the lack of a standardized system or technology specifically designed for this purpose exacerbates the problem. Existing solutions such as metal detectors or stud finders are ill-suited for accurately pinpointing holes in ceilings or floors, as they primarily detect metal objects within the wall structure rather than holes in horizontal surfaces. Contractors have resorted to using items, such a wire extending through the hole as a means to locate the hole, but these can be difficult to see particularly in dimly lit areas, such as an attick.

Recognizing the need for a reliable and efficient method to identify the location of drilled holes in ceilings or floors during construction and subsequent maintenance, the instant innovator has embarked on the development of a device and system tailored to address this challenge. These solutions leverage the device's ability to facilitatie the precise localization of drilled holes in these surfaces.

SUMMARY OF INVENTION

It is a general object to improve construction techniques.

It is another object to improve the ability to locate predrilled holes in a ceiling, floor or other walled surface.

Another object is to reduce the risk of damaging an existing structure with the aid of a device and system for locating holes in a surface provided by the instant invention.

A further object is to reduce the time required for locating predrilled holes in a construction surface.

Still a further object is to provide a device for aiding in detection of location of holes in a substrate of a building.

Another object is to provide a system for detecting a plurality of hole locations in a subsurface of a building.

A further object is to provide a color coded system for aiding in detection olocation of holes in a substrate of a building, wherein a predetermined color is designated for a particular trade contractor.

Accordingly, an embodiment of the instant invention is directed to a spotter bit for use with a hole of a predetermined diameter D extending through a construction substrate having a thickness T which includes a first end configured to be positionably disposed against the construction substrate and a second end extending from the first end and is elongated and has a diameter D' less than the hole diameter D and a length L longer than the thickness T and extending beyond a surface of the substrate when the second end extends through the hole and first end abuts the construction substrate, and wherein the second end is configured to illuminate in a predetermined color within a visible spectrum of light. In this regard, each spotter bit can be equipped to illuminate one or more spectrum of light corresponding to a predetermined construction trade. For example, electrical can be orange and/or yellow light, heating, ventilation, and air conditioning (HVAC) can be red and/or green light and plumbing can be blue and/or white light. The color selection is selectable, the notion is to have different light color for each trade application and/or to indicate the direction of inflow and outflow of the carrier element, be it a positive, negative wire, air duct out and return, or plumbing line hot/cold, for example.

The first end can preferably be equipped with a housing made of metal or plastic having operably disposed therein a power source, such as a battery, which operably connects to the second end in a manner to deliver power thereto to cause illumination thereof. The first end can include an on/off switch to control illumination of the second end. The first end of the spotter bit can also include an audible sound chip operably connected thereto to assist in emitting a sound for location.

The second end can be of a length L, for example, more than 12 inches. Additionally, the second end of the spotter bit can be be flexible or rigid and can include and LED or other illuminatable material such as a clear material which can be illuminated from the first end having a light source operably disposed therein.

While not needed in the case where the second end extends downward with the first end supported above the construction substrate and held in place by gravity, there can be provided an adapter to maintain the position of the spotter bit in the case where the second end extends upward, e.g., through a ceiling hole. In this regard, the adapter has a central opening for receiving the second end of the spotter bit and includes arms which extend through the hole, and a base which abuts the construction substrate (e.g., ceiling), which includes a retainer, such as a magnetic surface, to hold the first end of the spotter bit. When the arms are extended through the hole, and second end of the spotter bit is pushed through the adapter, the arms move radially outward to frictionally retain the adapter and spotter bit in place.

In conclusion, the problem of identifying drilled holes in ceilings or floors during construction represents a significant impediment to efficient building management and maintenance. However, through ongoing research and innovation, the instant invention provides a promising solution to address this challenge, empowering construction professionals with the tools and technologies needed to streamline operations, minimize errors, and enhance the overall quality and longevity of built environments.

DETAILED DESCRIPTION OF THE PREFERRED EMBODIMENTS

Figure 7:
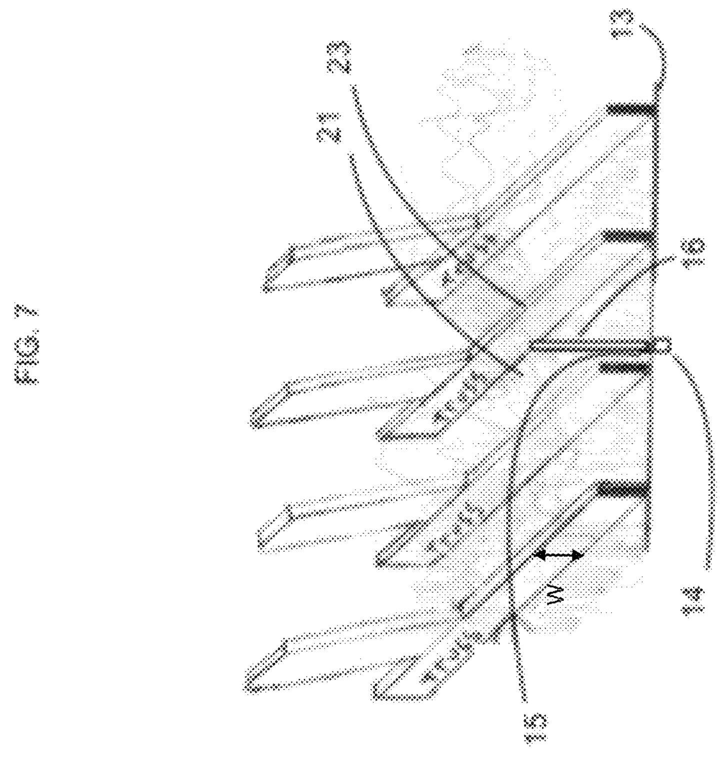
FIG. 7 illustrates use of components of the invention in a ceiling.
Figure 6:
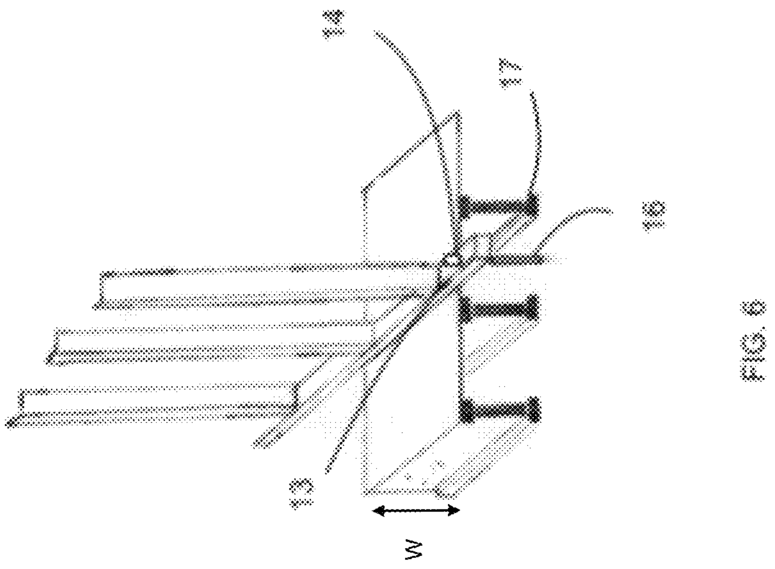
FIG. 6 illustrates use of components of the invention in a floor.

Referring now to the drawings, a spotter bit of the instant invention is generally designated by the numeral 10. The spotter bit 10 is for use with a hole 12 of a predetermined diameter D extending through a construction substrate 13 having a thickness T. The spotter bit 10 includes a first end 14 configured to be positionably disposed against the construction substrate 13 and a second end 16 extending from the first end 14 and is elongated and has a diameter D' less than the hole diameter D and a length L longer than the thickness T, and preferably longer than joist 17 width and truss 23 width as depicted in FIGS. 6 and 7.

The second end 16 is configured to extend beyond a surface 15 of the substrate 13 when the second end 16 extends through the hole 12 and first end abuts the construction substrate 13, and wherein the second end 16 is configured to illuminate in a predetermined color within a visible spectrum of light. In this regard, each spotter bit 10 can be equipped to illuminate one or more spectrum of light corresponding to a predetermined corresponding to a predetermined carrier element for construction trade. For example, electrical can be orange and/or yellow light; heating, ventilation, and air conditioning (HVAC) for outflow and/or return can be red and/or green light; and plumbing can be blue and/or white light for hot/cold lines. The color is selectable, the notion is to have different light color for each trade application and/or to indicate the direction of inflow and outflow of the carrier element, be it a hot wire, ground wire, air duct out and return, or plumbing line hot/cold, for example. The first end 14 can preferably be equipped with a housing 18 made of metal or plastic having operably disposed therein a power source 20 (shown in dashed lines), such as a rechargeable battery, which operably connects to the second end 16 in a manner to deliver power thereto to cause illumination thereof.

The first end 14 can include an on/off switch 22 to control illumination of the second end 16. The first end 14 of the spotter bit 10 can also include an audible sound chip 24 (shown in dashed lines) operably connected thereto to assist in emitting a sound for location.

The second end 16 can be of a length L, for example, more than 12 inches, for example, it is envisioned that the suitable length can preferably be from 12 inches to 24 inches. Additionally, the second end 16 of the spotter bit 10 can be be flexible or rigid and can include an LED or other illuminatable material such as a clear material which can be illuminated from the first end 14 having a light source 19 operably disposed therein.

Figure 1:
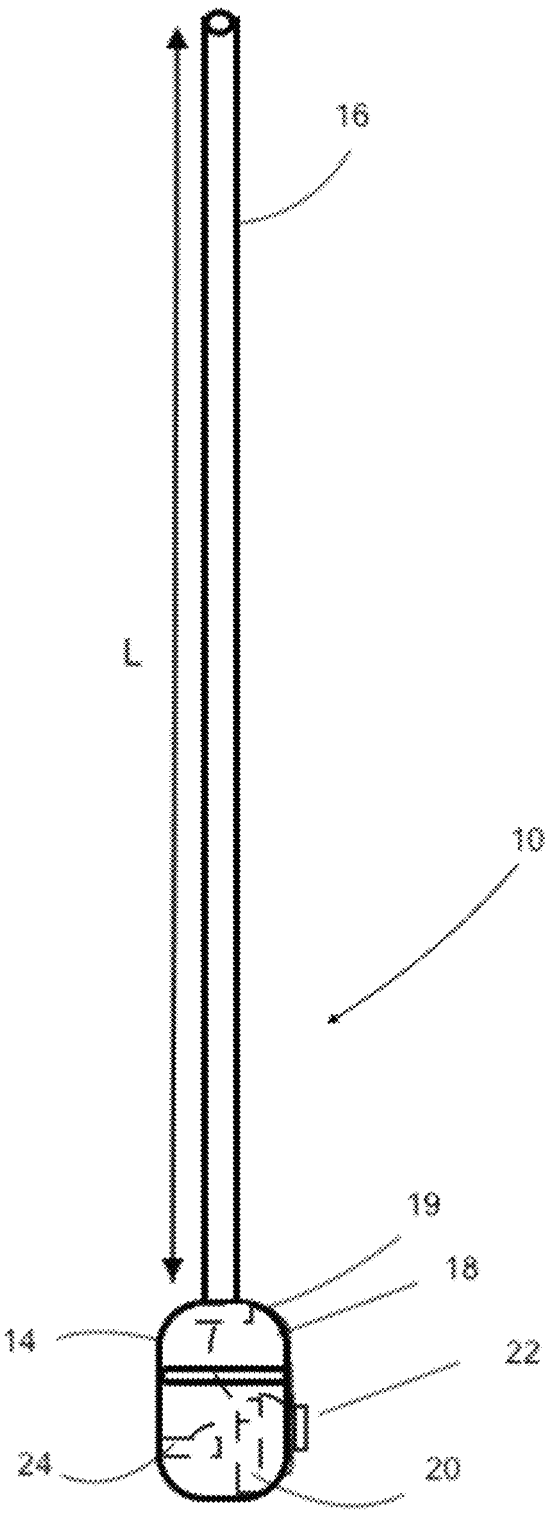
FIG. 1 is a side view of an embodiment of the spotter bit of the invention revealing internal components in dashed lines.
Figures 2, 3A, 3B:
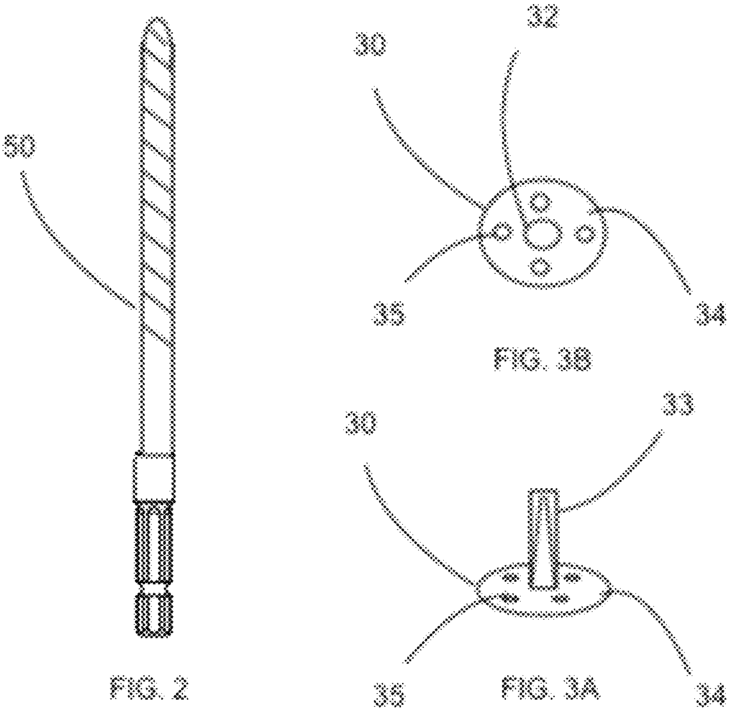
FIG. 2. is side view of an pilot bit for use with the invention.
FIG. 3A is a perspective view of an adapter for use with the spotter bit of the invention.
FIG. 3B is a bottom view of the adapter for use with the spotter bit of the invention in FIG. 3A.
Figure 4:
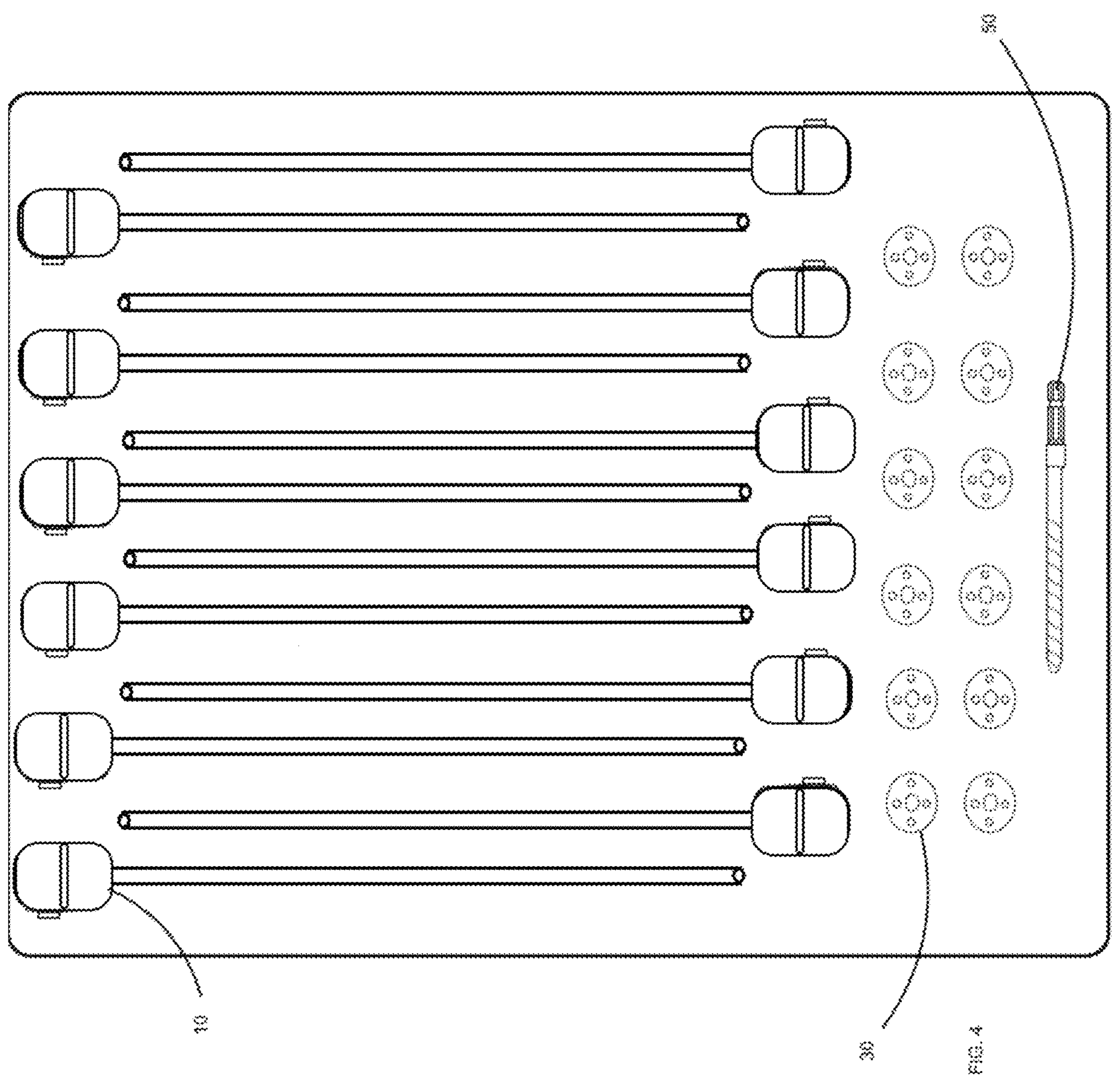
FIG. 4 depicts a set of components for use as a system in the invention.
Figure 5:
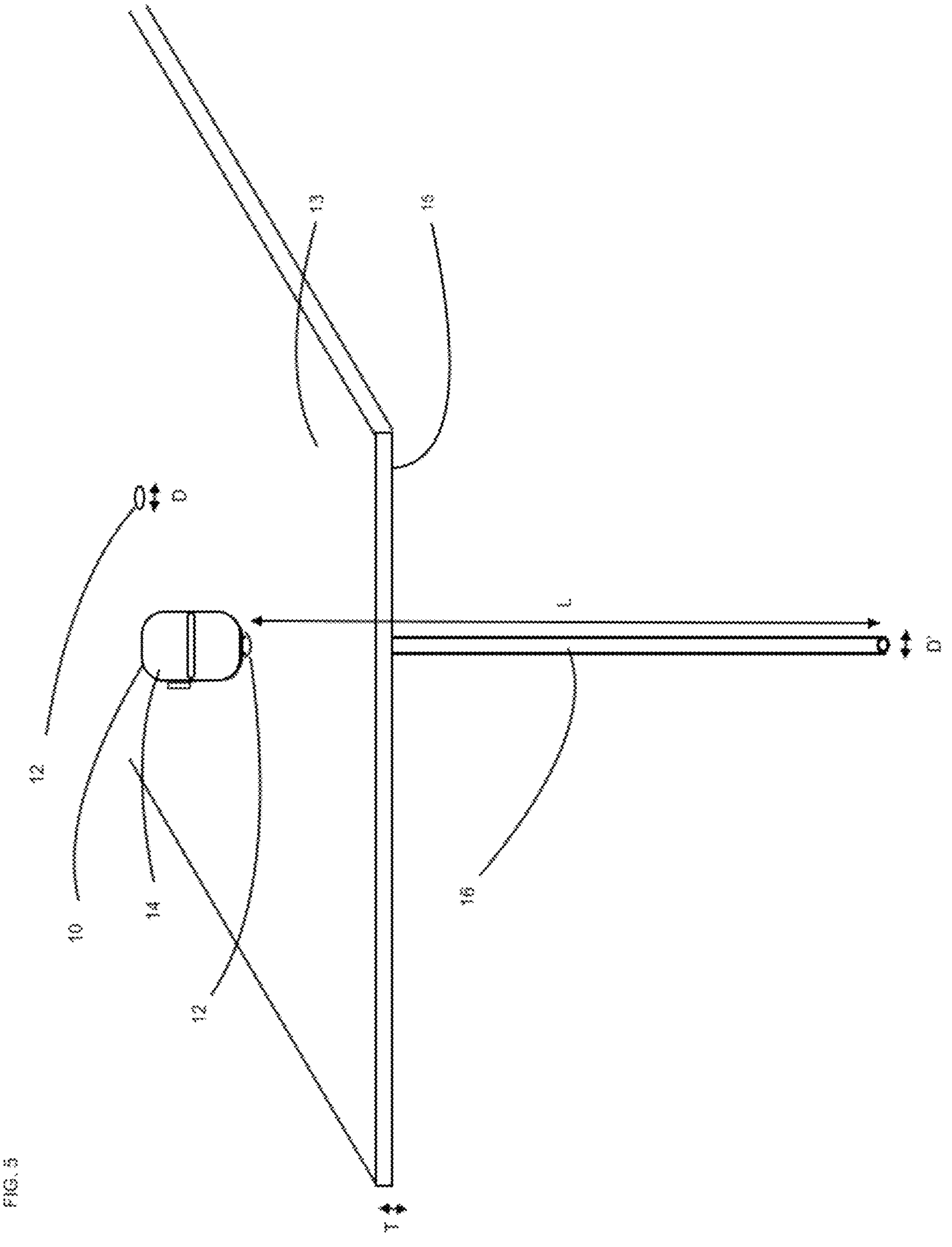
FIG. 5 illustrates use of the invention in a construction substrate.

A pilot bit 50 is provided which can be a high strength carbide steel drill bit, such as 3⁄16", 1⁄4" or 5⁄16" diameter, configured with or without a 1⁄4" hex shank. A set of spotter bits 10 as seen in FIG. 4 can have second end 16 with lengths of 12", 18" or 24" for example, and adapters 30. A set of spotter bits 10 is desirable when drilling a series of holes 12 in the construction substrate 13 and the user can insert a spotter bit 10 through each hole 12 and thus provide a system of identifying a plurality of holes in construction substrate 13.

While not needed in the case where the second end 16 extends downward preferably below joists 17 with the first end 14 supported above the construction substrate 13, floor, and held in place by gravity as is seen in FIG. 6, there can be provided one of the adapters 30 to maintain position of the spotter bit 10 in the case where the second end 16 extends upward, e.g., through a ceiling hole 12 and insulation 21 between trusses 23 as seen in FIG. 7. In this regard, the adapter 30 has a central opening 32 for receiving the second end 16 of the spotter bit 10 and includes arms 33 which extend through the hole 12, and a base 34 which abuts the construction substrate 13. The base 34 can includes a retainer 35, such as a magnetic surface, to aid in holding the first end 14 of the spotter bit 10. When the arms 33 are extended through the hole 12, and second end 16 of the spotter bit 10 is pushed through the adapter 30, the arms 33 move radially outward to frictionally retain the adapter 30 and spotter bit 10 in place.

Figure 8:
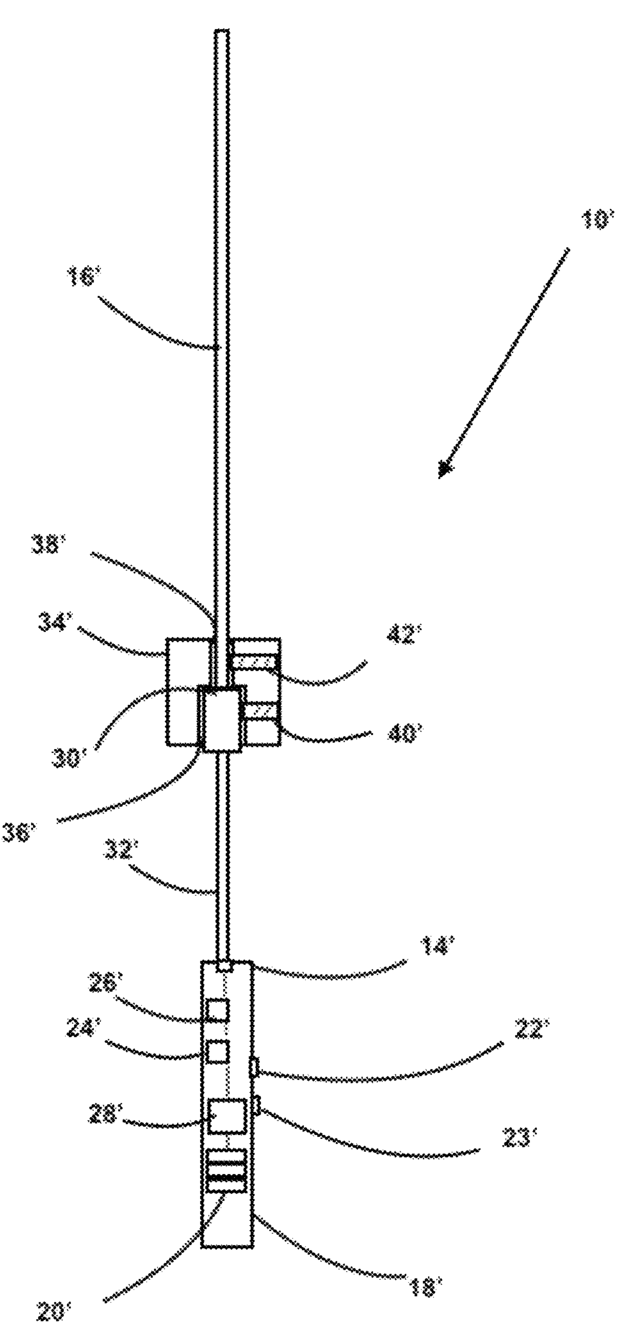
FIG. 8 depicts another embodiment of the invention.

FIG. 8 depicts another embodiment of the invention in a cross sectional view, here the spotter bit 10' can have a first end 14' preferably be equipped with a housing 18' made of metal or plastic having operably disposed therein a power source 20', such as one or more battery, which operably connects to the second end 16' in a manner to deliver power to enable illumination of second end 16'.

The first end 14' can include an on/off switch 22' and an LED color selection switch 23' to control illumination of the second end 16' A light emitting head 30' can be equipped with multi-color fixture or clusters of individual red, green, and blue LED elements. By varying the light from these primary hues, the fixture can produce any color through additive mixing. Cranking up all LED elements equally blends them together to produce natural white light. The light emitting head 30' is connected to the housing 18' by way of a flexible wire neck 32'. It is also contemplated that a color lens can be used between the light emitting head 30' and the second end 16'.

The first end 14' of the spotter bit 10 can also include an audible sound chip 24', a blue tooth device, 26' and a micro processor 28' for controlling the components. The micro processor 28' can control the operation of each of the blue tooth device 26' and sound chip 24'.

In this embodiment, an intermediate connector 34' is provided which includes head receiving surface 36' and a second end receiving surface 38'. Set screws 40' and 42' hold the respective light emitting head 30' and second end 16' in position. While depicted here as a multi-component device, it is contemplated, that the invention can be constructed into an integral singular device, or comprise multiple components to arrive at the invention.

With the configuration in FIG. 8, the second end 16' can be changed out and thus, various different lengths can be employed for the particular need or application. For example, it is envisioned that the suitable length can preferably be from 6, 12 inches to 24 inches. The second end 16' of the spotter bit 10' can be be flexible or rigid and can include an illuminatable material such as a clear material which can be illuminated from the light emitting head 30'.

With the blue tooth device 26' and micro processor 28', there is provided a communication mechanism whereby the spotter bit 10' can be remotely controlled via another computer based device such as a smart phone, tablet or computer. An exact location of the spotter bit 10' can be provided with the location of the blue tooth. This is helpful in that once all spotter bits 10' are in place, and the site plan can be updated with final locations of each item and this will be helpful in assisting other construction on site.

While the description above discloses preferred embodiments of the present invention, it is contemplated that numerous variations and modifications of the invention are possible and are considered to be within the scope of the claims that follow.

What is claimed is:

1. A spotter bit for use with a hole of a predetermined diameter D extending through a construction substrate having a thickness T, which includes:

a first end configured to be positionably disposed against the construction substrate and a second end extending from said first end and is elongated and has a diameter D' less than the hole diameter D and a length L longer than the thickness T of the construction substrate and extending beyond a surface of the construction substrate when said second end extends through the hole and said first end disposed adjacent the construction substrate, and wherein said second end is configured to illuminate in a predetermined color within a visible spectrum of light.

2. A spotter bit for use with a hole of a predetermined diameter D extending through a construction substrate having a thickness T, which includes:

a first end configured to be positionably disposed against the construction substrate and a second end extending from said first end and is elongated and has a diameter D' less than the hole diameter D and a length L longer than the thickness T of the construction substrate and extending beyond a surface of the construction substrate when said second end extends through the hole and said first end disposed adjacent the construction substrate, and wherein said second end is configured to illuminate in a predetermined color within a visible spectrum of light, said first end is equipped with a housing made of one of metal and plastic having operably disposed therein a power source to deliver power to cause illumination of said second end, and a micro processor operably connected to said power source and a switch which when actuated, enables selective control of said illumination.

3. The spotter bit of claim 2, wherein said spotter bit is equipped to enable selection of a plurality of colors of illumination, wherein at least one color corresponds to a carrier element for plumbing, at least one color different than that for plumbing corresponds to a carrier element for heating, ventilation, and air conditioning and at least one color different than that for plumbing, heating, ventilation, and air conditioning corresponds to a carrier element for electrical.

4. The spotter bit of claim 1, wherein said first end is equipped with a housing made of one of metal and plastic having operably disposed therein a power source to deliver power to cause illumination of said second end.

5. The spotter bit of claim 4, wherein said power source includes a battery.

6. The spotter bit of claim 1, which as a power source and wherein said first end includes a switch to control illumination of said second end.

7. The spotter bit of claim 1, wherein said first end of said spotter bit includes an audible sound chip operably connected thereto to assist in emitting a sound for location.

8. The spotter bit of claim 1, wherein the construction substrate connects to one of a truss and a joist for support thereof and said second end length L is greater than the thickness T plus width W of said one of the truss and joist.

9. The spotter bit of claim 2, which includes a blue tooth device connected to said micro processor.

10. The spotter bit of claim 2, which includes an audible sound chip connected to said micro processor to assist in emitting a sound for location of said spotter bit.

11. A spotter bit system for use in locating a plurality of holes in a construction substrate, which includes:

a plurality of spotter bits, each spotter bit for use with a hole of a predetermined diameter D extending through a construction substrate having a thickness T and has a first end configured to be positionably disposed against the construction substrate and a second end extending from the first end and is elongated and has a diameter D' less than the hole diameter D and a length L longer than the thickness T of the construction substrate and extending beyond a surface of the construction substrate when said second end extends through the hole and said first end abuts the construction substrate, and wherein said second end is configured to illuminate in a predetermined color within a visible spectrum of light corresponding to a predetermined construction carrier element.

12. The spotter bit system of claim 11, wherein said spotter bit is equipped to enable selection of a plurality of colors of illumination, wherein at least one color corresponds to a carrier element for plumbing, at least one color different than that for plumbing corresponds to a carrier element for heating, ventilation, and air conditioning and at least one color different than that for plumbing, heating, ventilation, and air conditioning corresponds to a carrier element for electrical.

13. The spotter bit system of claim 11, wherein each said first end is equipped with a housing made of one of metal and plastic having operably disposed therein a power source to deliver power to enable illumination of said second end.

14. The spotter bit system of claim 13, wherein each said power source includes a battery.

15. The spotter bit system of claim 11, wherein each Said first end includes a switch to control illumination of said second end.

16. The spotter bit system of claim 11, wherein each said first end of said spotter bit includes an audible sound chip operably connected thereto to assist in emitting a sound for location.

17. The spotter bit system of claim 11, wherein each the construction substrate connects to is further characterized to include one of a truss and a joist connected thereto for support thereof and said second end length L is greater than the thickness T plus width W of said one of the truss and the joist.

18. The spotter bit of claim 14, which includes a micro processor operably connected to said power source and a switch which when actuated, enables selective control of said illumination.

19. The spotter bit of claim 18, which includes a blue tooth device connected to said micro processor.

20. The spotter bit of claim 18, which includes an audible sound chip connected to said micro processor to assist in emitting a sound for location of said spotter bit.

21. The spotter bit of claim 1, wherein said second end is configured to illuminate along the length of said second end.

22. The spotter bit of claim 2, wherein said second end is configured to illuminate along the length of said second end.

23. The spotter bit of claim 11, wherein each said second end is configured to illuminate along the length of each said second end.

* * * * *